United States Patent
Grunzinger, Jr. et al.

(10) Patent No.: US 10,803,340 B2
(45) Date of Patent: Oct. 13, 2020

(54) METHOD AND APPARATUS FOR LICENSE PLATE RECOGNITION USING MULTIPLE FIELDS OF VIEW

(71) Applicant: Hunter Engineering Company, Bridgeton, MO (US)

(72) Inventors: Philip G. Grunzinger, Jr., Valley Park, MO (US); Timothy A. Strege, Sunset Hills, MO (US); Kevin V. Schoemehl, St. Louis, MO (US)

(73) Assignee: Hunter Engineering Company, St. Louis, MO (US)

(*) Notice: Subject to any disclaimer, the term of this patent is extended or adjusted under 35 U.S.C. 154(b) by 132 days.

(21) Appl. No.: 16/213,416

(22) Filed: Dec. 7, 2018

(65) Prior Publication Data

US 2019/0180132 A1    Jun. 13, 2019

Related U.S. Application Data

(60) Provisional application No. 62/596,517, filed on Dec. 8, 2017.

(51) Int. Cl.
| | |
|---|---|
| *G06K 9/00* | (2006.01) |
| *G06K 9/32* | (2006.01) |
| *G06K 9/20* | (2006.01) |
| *G01B 11/275* | (2006.01) |
| *H04N 5/247* | (2006.01) |

(52) U.S. Cl.
CPC .......... *G06K 9/325* (2013.01); *G01B 11/2755* (2013.01); *G06K 9/209* (2013.01); *H04N 5/247* (2013.01); *G06K 2209/15* (2013.01)

(58) Field of Classification Search
CPC .... G06K 9/325; G06K 9/209; G06K 2209/15; G01B 11/2755; H04N 5/247
USPC .......................................................... 382/105
See application file for complete search history.

(56) References Cited

U.S. PATENT DOCUMENTS

| | | | |
|---|---|---|---|
| 8,243,140 B1 | 8/2012 | Howe | |
| 8,775,235 B2* | 7/2014 | Hedley | G06K 9/00785 705/13 |
| 9,042,647 B2* | 5/2015 | Kozitsky | G06K 9/00624 382/171 |
| 9,240,078 B2* | 1/2016 | Hedley | H04N 7/188 |
| 9,363,357 B2* | 6/2016 | Hansen | H04M 1/72547 |
| 9,644,952 B2* | 5/2017 | Shylanski | G01B 11/2755 |
| 9,779,561 B1* | 10/2017 | Dorrance | G07C 5/0808 |

(Continued)

*Primary Examiner* — Marceau Milord
(74) *Attorney, Agent, or Firm* — Sandberg Phoenix & von Gontard, P.C.

(57) ABSTRACT

A vehicle service system incorporating a set of imaging sensors disposed in an inspection lane through which a vehicle is driven. A first imaging sensor is disposed with a field of view aligned to observe leading surfaces on an approaching vehicle, while a second imaging sensor is disposed with a field of view aligned to observe trailing surfaces of a departing vehicle. A processor is configured with software instructions to capture a set of images from the first imaging sensor as the vehicle approaches, and a set of images from the second imaging sensor as the vehicle departs. The processor evaluates the acquired images from the first and second imaging sensors according to a set of rules to identify images in which a license plate is present on an observed surface of the vehicle, and to extract license plate information from at least one of the identified images.

15 Claims, 4 Drawing Sheets

(56) References Cited

U.S. PATENT DOCUMENTS

| | | | |
|---|---|---|---|
| 9,785,610 B1* | 10/2017 | Larson | B60C 25/132 |
| 9,805,697 B1* | 10/2017 | Dorrance | G09G 5/40 |
| 9,818,154 B1* | 11/2017 | Wilbert | G06Q 40/025 |
| 2007/0008179 A1 | 1/2007 | Hedley et al. | |
| 2008/0116377 A1* | 5/2008 | Luk | G01N 21/3518 |
| | | | 250/338.5 |
| 2010/0228607 A1* | 9/2010 | Hedley | G06K 9/325 |
| | | | 705/13 |
| 2010/0254019 A1* | 10/2010 | Cui | G01S 13/867 |
| | | | 359/633 |
| 2013/0100290 A1* | 4/2013 | Sato | G06T 3/00 |
| | | | 348/148 |
| 2013/0158777 A1 | 6/2013 | Brauer et al. | |
| 2014/0074567 A1* | 3/2014 | Hedley | G06K 9/78 |
| | | | 705/13 |
| 2014/0159925 A1* | 6/2014 | Mimeault | G08G 1/0175 |
| | | | 340/935 |
| 2014/0207344 A1* | 7/2014 | Ihlenburg | E05F 15/73 |
| | | | 701/49 |
| 2015/0073642 A1* | 3/2015 | Widmer | G01C 21/36 |
| | | | 701/22 |
| 2016/0049015 A1* | 2/2016 | Hedley | G07B 15/063 |
| | | | 705/13 |
| 2017/0140237 A1* | 5/2017 | Voeller | G06K 9/3258 |
| 2018/0100783 A1* | 4/2018 | Stieff | G01S 13/931 |

\* cited by examiner

METHOD AND APPARATUS FOR LICENSE PLATE RECOGNITION USING MULTIPLE FIELDS OF VIEW

CROSS-REFERENCE TO RELATED APPLICATIONS

The present application is related to, and claims priority from, U.S. Provisional Patent Application Ser. No. 62/596,517 filed on Dec. 8, 2017, and which is herein incorporated by reference.

STATEMENT REGARDING FEDERALLY SPONSORED RESEARCH

Not Applicable.

BACKGROUND OF THE INVENTION

The present application relates generally to an optical imaging system configured to acquire images of license plates on passing vehicles for processing to extract license plate information identifying the vehicles, and in particular, to an imaging system within a drive-through vehicle wheel alignment inspection lane configured to utilize vehicle images acquired from at least two different fields of view to identify license plate information associated with each passing vehicle.

License plate recognition (LPR) systems acquire images of vehicles passing through a field of view or detection zone, process the images to identify and extract license plate information, and pass the extracted information on to a vehicle identification or tracking system. A typical LPR system consists of a dedicated camera at a fixed location, including an imaging sensor, associated optical elements, and optionally an illumination source, such as a high-speed flash or infrared light source. The camera is disposed with a fixed field of view oriented towards a region of space through which vehicles will pass, either as they approach the system exposing the front license plate, or as they recede away from the system exposing the rear license plate. Exemplary placement locations would be in proximity to either the entrance or exit of a tunnel, bridge, limited access motor way, parking structure or toll booth. Additional installations include controlled traffic intersections and speed monitoring check points. Cameras and systems configured as dedicated LPR systems in traffic control and monitoring applications utilize high quality optical elements and lighting systems to ensure that a high-quality and usable image of each passing vehicle is captured, generally independent of vehicle speed and ambient lighting conditions.

Similarly, cameras and systems configured as dedicated LPR systems in vehicle identification applications wherein vehicle speeds are limited or controlled, and ambient lighting conditions adjusted to meet minimum standards, can be configured to acquire a sequence of images of vehicles as they move through a detection zone defined by the camera field of view. Images within the sequence are processed sequentially until an image is reached within which license plate information is identified. For example, a vehicle entering a vehicle service shop inspection lane may be captured in a series of images initiated by the vehicle activating a trigger. Depending on the vehicle configuration, the license plate may not be visible in the first few captured images, and instead becomes clearly visible only when the vehicle moves further into the observed field of view. If the locations at which the camera can be placed are limited, such as in a vehicle inspection lane, due to the proximity of walls, ceilings, doors, or other obstructions, the field of view may be less than optimal for acquiring license plate images. Similarly, while a minimum ambient lighting may be present, variations in illumination, such as due to changing sun position during the daytime, can adversely influence the quality of acquired images.

Accordingly, it would be beneficial for a vehicle license plate recognition module of vehicle wheel alignment inspection or vehicle identification system to acquire and process images of a moving vehicle from multiple points of view in order to improve the chances of the relevant portions of the vehicle being ideally positioned for acquisition of usable license plate images, and to counter the effects of varying ambient illumination, glare, or reflection on the acquired images. It would be further beneficial to provide the vehicle license plate recognition system with control logic capable of identifying which field of view offers license plate images having a high level of accuracy confidence in view of the configuration of the observed vehicle and current ambient lighting conditions, so as to avoid the need to acquire and/or process additional images having lower accuracy confidence acquired from cameras with different viewpoints.

BRIEF SUMMARY OF THE INVENTION

Briefly stated, the present disclosure sets forth a vehicle service system, such as a drive through vehicle wheel alignment inspection system or a vehicle identification system, incorporating a set of imaging sensors disposed in proximity to an inspection lane through which a vehicle is driven. At least a first imaging sensor is positioned and oriented with a field of view aligned to observe the leading surfaces on the vehicle as it approaches an inspection region within the inspection lane, while at least a second imaging sensor is positioned and oriented with a field of view aligned to observe trailing surfaces of the vehicle as it departs from the inspection region. A processor within the vehicle service system is configured with software instructions to capture a set of images from each imaging sensor as the vehicle passes through the inspection region. The processor evaluates the captured images according to a set of rules to identify images in which a license plate is present on an observed surface of the vehicle, and to extract license plate information from at least one of the identified images.

In a further embodiment of the present disclosure, additional imaging sensors are positioned and oriented to observe either the leading or trailing surfaces of the vehicle with fields of view which differ from the fields of view of the first and second imaging sensors.

In a further embodiment of the present disclosure, additional imaging sensors are positioned and oriented with fields of view aligned to observe either the leading or trailing surfaces of the vehicle from an opposite lateral side of the vehicle from the fields of view of at least one of the first and second imaging sensors.

In a further embodiment of the present disclosure, the processing system is configured with software instructions to evaluate in parallel, multiple images of a vehicle, acquired from multiple fields of view, to determine if a license plate is visible within the images. If a license plate is determined to be visible within an image, the software instructions further configure the processing system to extract license plate information together with an indication of confidence in the accuracy of the extracted information. As configured with the software instructions, the processing system responds to an indication of confidence reaching a threshold for at least one image to accept the license plate information for purposes of vehicle identification, terminating further image processing. Absent an indication of confidence exceeding the threshold, the processor continues to evaluate the remaining identified images in which a license plate is present, repeating the evaluation procedures until the extracted information for at least one image meets the required confidence level, or all images of the vehicle have been evaluated.

In an additional embodiment of the present disclosure, a vehicle service system is configured with a set of cameras for acquiring sequential inspection images of a vehicle passing through an observation region of a drive-through vehicle wheel alignment inspection lane. The set of cameras includes at least two cameras positioned adjacent a driver side of the observation region, and at least two cameras positioned adjacent a passenger side of the observation region, providing four unique fields of view. One camera on each side of the observation region has a field of view oriented to observe an associated side surface of the passing vehicle and to observe a front surface of the passing vehicle, while a second camera on each side of the observation region has a field of view oriented to observe the associated side surface, and to observe a rear surface of the passing vehicle. A processing module of the vehicle service system is configured with software instructions to acquire inspection images from each of the cameras, and to evaluate in parallel, at least a portion of the acquired images which capture either the front or rear surfaces of a passing vehicle to extract identifying license plate information associated with the vehicle until the extracted identifying license plate information from at least one image meets a minimum confidence measure.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
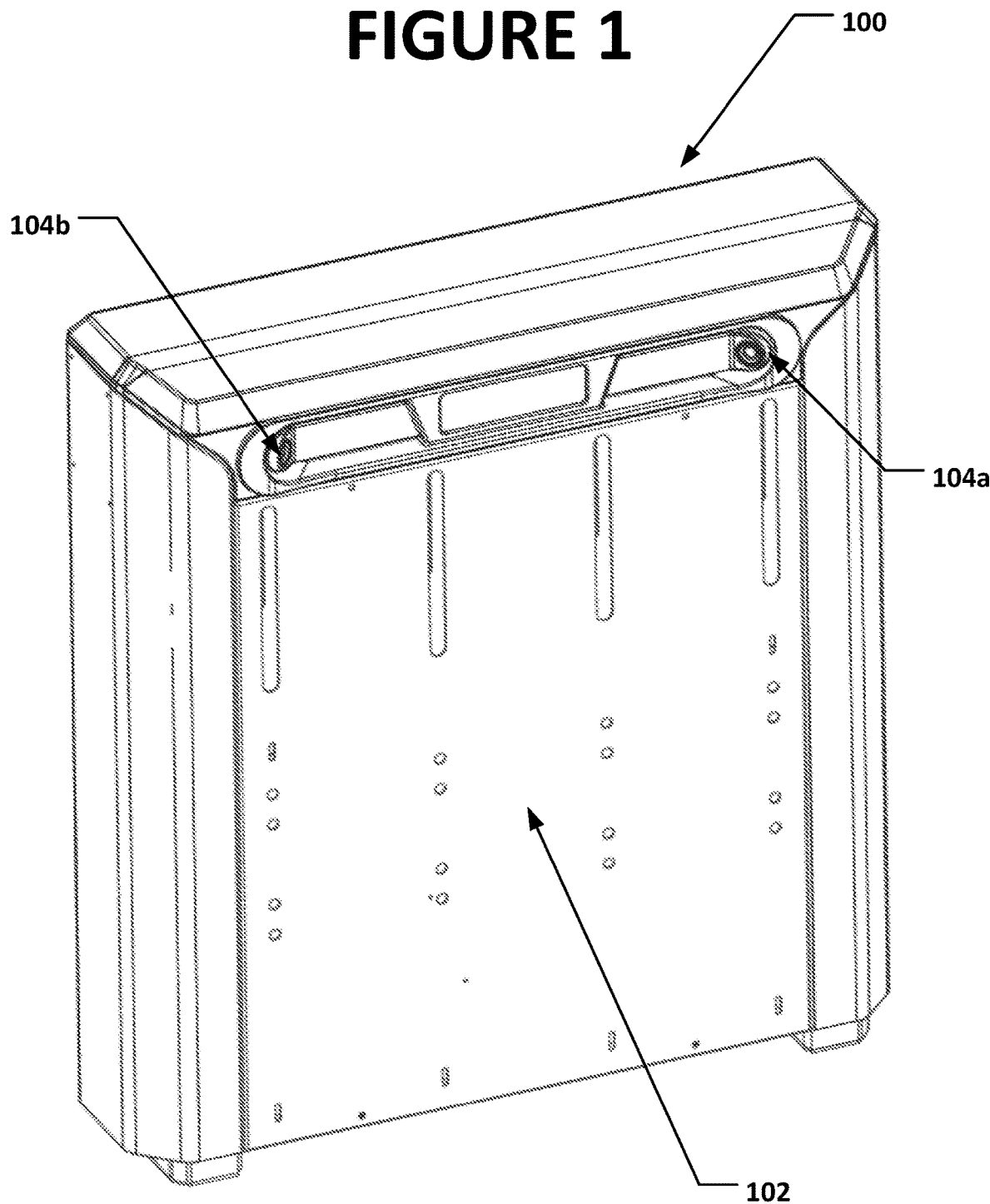
FIG. 1 is a perspective view of a vehicle wheel alignment inspection unit, including a pair of cameras for acquiring vehicle images from two different fields of view.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

Turning to the figures, and to FIG. 1 in particular, an exemplary vehicle wheel alignment inspection unit 100 is shown. The inspection unit 100 provides a housing 102 for enclosing various sensors (not shown), as well as a pair of cameras 104a, 104b (and associated optical elements) for acquiring images of a vehicle V moving past a longitudinal side of the inspection unit 100. The cameras 104a, 104b are positioned and oriented to have different fields of view, with one camera 104a providing a field of view oriented towards a vehicle approach direction. The other camera 104b provides a field of view oriented towards a vehicle departure direction. A combined set of images acquired by the pair of cameras 104a, 104b as a vehicle V approaches, passes, and departs from the vicinity of the inspection unit 100 includes images of the front and rear surfaces of the vehicle V, together with images of one lateral side of the vehicle V.

Figure 2:
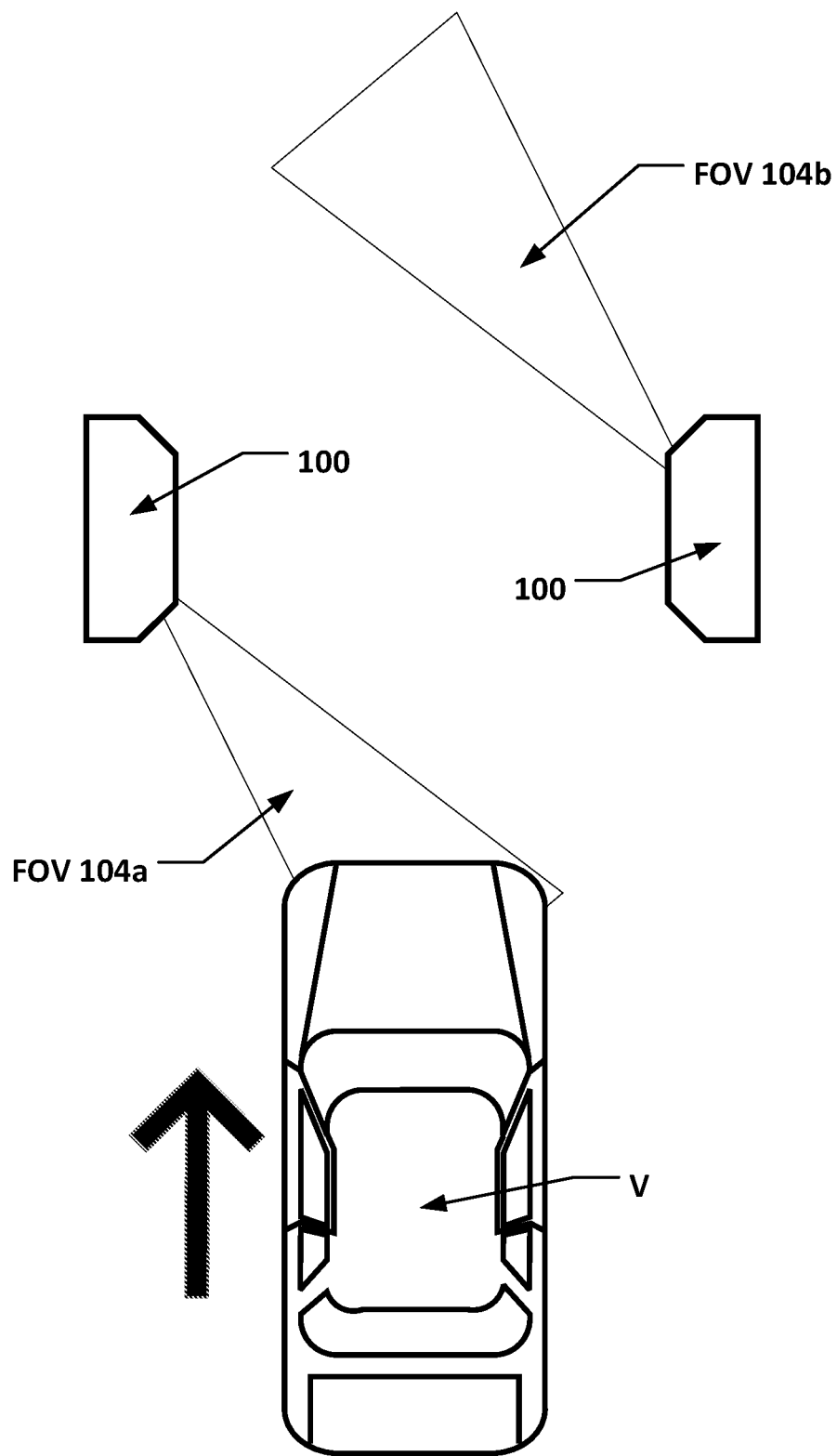
FIG. 2 is a plan view of a vehicle wheel alignment inspection area, in which wheel alignment inspection units are placed in proximity to a drive-through inspection lane, providing multiple fields of view to independently observe both a front and a rear surface of vehicles passing through the lane.
Figure 3:
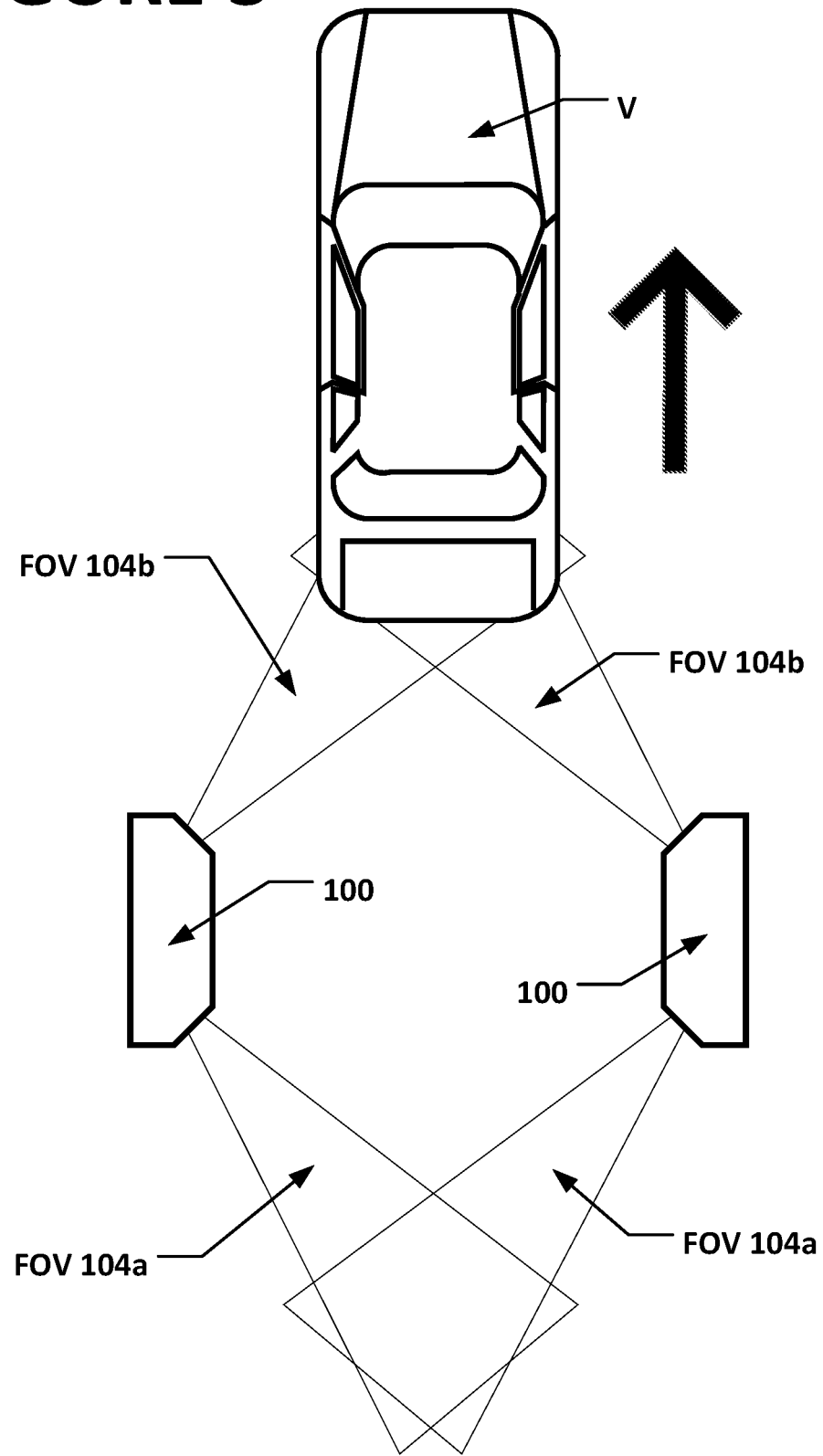
FIG. 3 is a plan view of a vehicle wheel alignment inspection area, in which wheel alignment inspection units are placed in proximity to a drive-through inspection lane, providing multiple fields of view to independently observe, from opposite lateral sides, both the front and the rear surfaces of vehicles passing through the lane.

By providing a second wheel alignment inspection unit 100 on an opposite side of an inspection lane or region through which the vehicle V passes, such as seen in FIGS. 2 and 3, images of the common front and rear surfaces of the vehicle V are captured from multiple viewpoints, together with images of the opposite lateral side of the vehicle V. A combined set of images from a pair of wheel alignment inspection units 100, with one inspection unit having at least an approach oriented camera 104a, and one inspection unit having at least a departure oriented camera 104b, as seen in FIG. 2, provides a visual record of the vehicle's peripheral appearance as it passes through the inspection lane or region between the inspection units. Utilizing a pair of cameras 104a, 104b in each inspection unit 100 on opposite lateral sides of a vehicle inspection lane, as seen in FIG. 3, provides alternative viewpoints from which images of common vehicle surfaces, such as the front or rear surfaces on which license plates are typically found, are captured.

The images acquired by the cameras 104a, 104b in each wheel alignment inspection unit 100 are conveyed to a processing system or image processing module configured with suitable software instructions, and may be utilized for a variety of purposes in addition to license plate recognition (LPR). For example, capturing a sequence of images from each camera 104a, 104b as a vehicle moves through an inspection lane or inspection region, allows multiple views of the vehicle surfaces (front, lateral sides, and rear) to be stored, establishing a time-stamped record of the vehicle's current appearance. Storing the resulting images in an accessible database, either locally or remote from the wheel alignment inspection units 100, facilitates review of a vehicle appearance at a subsequent point in time, as may be necessary to confirm the presence (or absence) of damage, scratches, dents, dings, etc.

It will be recognized that the specific configuration and placement of the cameras 104a and 104b may differ from that which is illustrated and described, provided that the cameras have sufficiently different fields of view, so as to capture images of the surfaces of a passing vehicle from at least two different viewpoints. Additional cameras may be utilized without departing from the scope of the disclosure.

In one embodiment of the present disclosure, images of a vehicle V acquired by two or more cameras, such as 104a and 104b are conveyed to an image processing module having a processor. Software instructions configure the processor to evaluate the image data to identify, within each evaluated image, the presence or absence of a vehicle license plate. For images in which a license plate is identified, the software instructions configure the processor to extract license plate data, such as alpha-numeric characters, colors, and configurations. In addition to extracting license plate data, the software instructions establish at least one confidence score or figure of merit associated with the extracted data. The confidence score or figure of merit represents a measure of certainty in the results, or any other metric pertaining to relevant information extracted from the license plate image. Results having a confidence score representing a measure of certainty below a minimum threshold are optionally discarded as unreliable. Confidence scores or figures of merit may include, but are not limited to, representations of image quality, image noise levels, image illumination levels, or representations of conformity of the extracted license plate data to one or more predetermined rules, filters, or expected results. A confidence score or a figure of merit may be expressed in any of a wide variety of forms, such as a pass/fail designation, an acceptable/unacceptable designation, or a numerical representation indicating a relevant degree of granularity.

The image processing module is further configured with software instructions to evaluate the image data received from multiple cameras 104a, 104b in one or more inspection units 100 in accordance with a selected set of rules. For example, in one configuration, image data may be evaluated in the chronological sequence in which the images were acquired, generally with images from cameras 104a having fields of view oriented towards an approaching vehicle V being evaluated prior to images from cameras 104b having fields of view oriented towards the vehicle V as it departs from the inspection region. If the image processing module includes multiple processors, or a multi-core processor, images may be evaluated in parallel with each other, significantly improving overall evaluation time. To further improve an overall image processing cycle time associated with a passing vehicle V, once license plate data extracted from at least one image is found to have a confidence score or figure of merit which meets a threshold, processing of remaining images of the vehicle V may be terminated, suspended, or reduced in priority by the image processing module, enabling the system to be reset to receive images for a new vehicle, increasing vehicle through-put.

Figure 4:
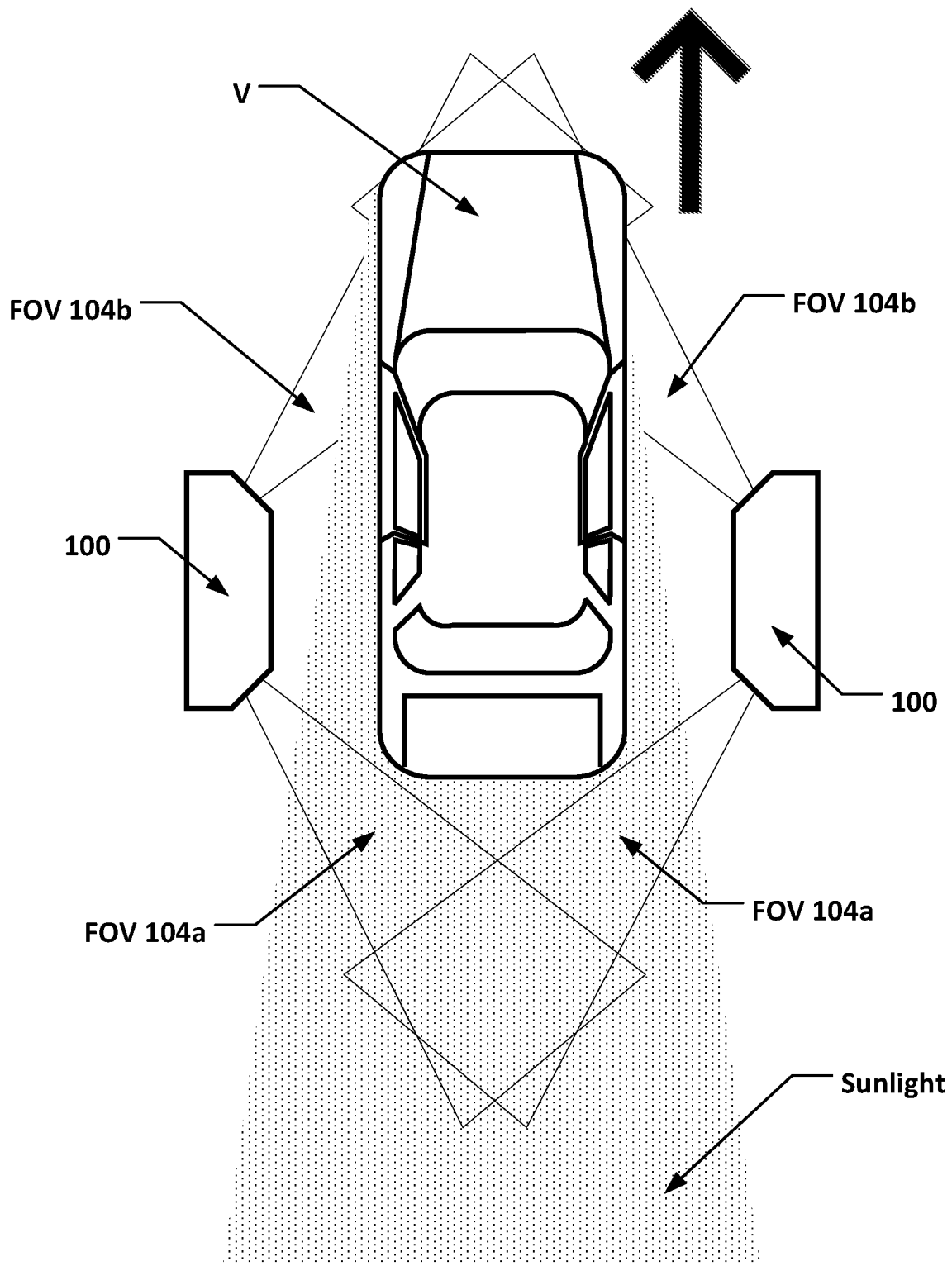
FIG. 4 is a plan view of a vehicle wheel alignment inspection area, in which wheel alignment inspection units are placed in proximity to an entrance to a drive-through inspection lane, providing multiple fields of view to independently observe the surface of vehicles passing through the lane, illustrating the potential for sunlight illumination to introduce glare or reflection optical effects.

In another configuration of the image processing module, software instructions implement a set of rules in a processor to accommodate changing ambient lighting conditions when evaluating image data received from multiple cameras 104a and 104b in one or more inspection units. The rules prioritize evaluation of images expected to have a higher confidence score based on the specific field of view of the camera from which they were acquired. For example, if it is known that the inspection lane or inspection region is subject to changing ambient sunlight conditions during the course of a day, such as shown in FIG. 4, images acquired from cameras 104a, 104b having fields of view which do not experience glare conditions may be prioritized for evaluation by the image processing module during select times of day. This may result in scenarios where images acquired of the vehicle as it departs from the inspection lane or inspection region are evaluated for visible license plate data before images acquired of the vehicle as it approaches the inspection lane or inspection region, due to adverse backlighting and shadowing conditions. Alternatively, images acquired from cameras installed in an inspection unit on one lateral side of the inspection lane may be prioritized for evaluation over images acquired from cameras installed in an inspection unit on the opposite side of the inspection lane, due to adverse glare or reflection conditions.

In an alternate configuration of the image processing module, the software instructions implement a set of rules in the processor for evaluating image data received from multiple cameras 104a and 104b in one or more inspection units 100 in order to accommodate vehicles having only a single license plate disposed at either the front or the rear. During conditions where no front license plate is detected in an image acquired from a camera having a clear field of view of the front surfaces of an approaching vehicle, such as by calculation of a low or zero confidence score or figure of merit, the set of rules is configured such that no further images of the vehicle front surfaces are evaluated, and instead, the processing module is switched to evaluating only images of the vehicle rear surfaces. Preventing further evaluation of images associated with the vehicle front (or rear) surfaces when no license plate is present on those surfaces reduces the overall image evaluation cycle time, improving system performance and vehicle through-put.

In a further embodiment of the present disclosure, the image processing module is configured with software instructions implementing a set of rules in the processor for evaluating image data received from multiple cameras 104a and 104b in one or more inspection units 100 in a manner which improves determination accuracy for license plate data associated with a vehicle passing through an inspection lane or inspection region. Once an image is evaluated for a visible license plate, and extracted license plate data is found to have a confidence score or figure of merit meeting a threshold, the software instructions provided to the processor confirm the license plate data by continuing to evaluate images of the license plate acquired from cameras 104a, 104b having different fields of view until matching extracted license plate data is found in at least one additional image having a confidence score meeting the threshold. This redundancy may be established by comparing images from fields of view of common vehicle surfaces (front or rear) obtained from cameras on opposite lateral sides of the inspection lane, or by comparing images from fields of view of different vehicle surfaces (front and rear) obtained from cameras disposed to view the vehicle during approach and during departure from the inspection lane. An overall measure of confidence in the resulting license plate data is provided based on a match of the license plate data between two or more evaluated images acquired from cameras having different fields of view.

In a further embodiment, a vehicle wheel alignment inspection system for inspecting a vehicle passing through an inspection lane comprises two inspection units. The first inspection unit is positioned adjacent a first lateral side of the inspection lane, and includes a first camera having a field of view oriented towards the inspection lane to acquire an image of a surface of a vehicle in motion passing through the inspection lane. The second inspection unit is positioned adjacent a second lateral side of the inspection lane, opposite from the first inspection unit. The second inspection unit similarly includes a second camera having a field of view, which overlaps the first camera field of view and is orientated towards the inspection lane to acquire a second image of the same surface of a vehicle. A processing system is operatively coupled to receive images from the first and second cameras. The processing system includes a processor configured with software instructions to generate a confidence score or figure of merit associated with each received image, representative of a quality of any vehicle license plate features identified on the common vehicle surface within the associated image. The processor is further configured with software instructions to generate an output representative of the identified vehicle license plate features in response to at least one of the confidence scores or figures of merit from the two images. For example, the processor may be configured with software instructions to generate the output representative of the identified vehicle license plate features from whichever of the images has a greater figure of merit. In a further example, the processor may be configured with software instructions to generate a figure of merit from the second image only if the figure of merit associated with the first image is below a threshold value. This enables the system to increase vehicle through-put and reduce processing time by generating an output representative of the identified vehicle license plate features from just the first image if the associated figure of merit meets the threshold value, eliminating the need and time required to evaluate the second or subsequent images.

Providing a vehicle wheel alignment inspection unit 100 with multiple cameras 104a, 104b positioned and oriented to capture images of a passing vehicle from different viewpoints facilitates the optional rendering of composite images of the observed vehicle surfaces. In one embodiment of the present disclosure, images acquired from two or more cameras 104a, 104b, each observing the same surface of a passing vehicle, such as the front or rear surface, are utilized by the image processing module to generate a composite image of the vehicle surface. The processor of the image processing module is configured with software instructions to align common points within two or more images of the vehicle acquired from different cameras, and to generate a composite image by combining the aligned image data to form a new image. The image processing module may be further configured with suitable software instructions to apply perspective correction to the generated composite image.

Images may be combined by the image processing module in order to present the full surfaces of the vehicle visible within a single composite image, i.e., by utilizing images from a camera viewing the left front side of an approaching vehicle together with images from a camera viewing the right front side of the approaching vehicle to generate a composite image of the full front surface of the vehicle. Images may be combined by the image processing module in order to compensate for lighting conditions or partially blocked fields of view. For example, if a portion of a vehicle license plate is partially obscured in an image from one camera, such as due to glare, shadow, or an obstruction, the missing portions of the image may be filled in using image data acquired from a different camera having an unobstructed view of the same surfaces of the vehicle.

The present disclosure can be embodied in-part in the form of computer-implemented processes and apparatuses for practicing those processes. The present disclosure can also be embodied in-part in the form of computer program code containing instructions embodied in tangible media, or another computer readable non-transitory storage medium, wherein, when the computer program code is loaded into, and executed by, an electronic device such as a computer, micro-processor or logic circuit, the device becomes an apparatus for practicing the present disclosure. The present disclosure can also be embodied in-part in the form of computer program code, for example, whether stored in a non-transitory storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits. As various changes could be made in the above constructions without departing from the scope of the disclosure, it is intended that all matter contained in the above description or shown in the accompanying drawings shall be interpreted as illustrative and not in a limiting sense.

The invention claimed is:

1. A method for identifying license plate features of a vehicle in motion within a vehicle inspection lane, comprising:
    acquiring a first image of said vehicle from a first camera, and a second image of said vehicle from a second camera, said first and second cameras having different fields of view encompassing a common observed surface of the vehicle;
    evaluating said first image to determine a presence or an absence of a license plate on said common observed surface of the vehicle, and responsive to said evaluation determining said presence in said first image, extracting data associated with features of said license plate from said first image;
    establishing for said first image, a first figure of merit based on said evaluation of said first image;
    responsive to said first figure of merit exceeding said threshold, generating an output representative of said license plate features of said vehicle in motion using said data extracted from said first image;
    responsive to said first figure of merit not exceeding a threshold,
        evaluating said second image to determine a presence or an absence of a license plate on an observed surface of the vehicle, and responsive to said evaluation determining said presence in said second image, extracting data associated with features of said license plate from said second image;
        establishing for said second image, a second figure of merit based on said evaluation of said second image; and
    responsive to said second figure of merit exceeding said threshold, generating an output representative of said license plate features of said vehicle in motion using said data extracted from said second image.

2. The method of claim 1 wherein said common observed surface of the vehicle is either a front surface of the vehicle or a rear surface of the vehicle.

3. A vehicle wheel alignment inspection system for inspecting the wheel alignment of a vehicle passing through an inspection lane, the vehicle wheel alignment inspection system including a processor operatively configured with software instructions, comprising:

at least one inspection unit for placement adjacent to the inspection lane;

a plurality of cameras associated with each inspection unit positioned and oriented to observe the vehicle passing through the inspection lane, each camera configured to acquire images of an associated field of view;

wherein the processor is configured with software instructions to receive images from said plurality of cameras and to select and evaluate at least one received image to identify a license plate present on an observed surface of the vehicle within said image, to extract license plate data therefrom, and to establish a confidence score associated with said extracted license plate data; and wherein said processor is further configured with software instructions to respond to said confidence score to either repeat said evaluation and extraction using a previously unselected received image, or to generate an output associated with said extracted license plate data.

4. The vehicle wheel alignment inspection system of claim 3 wherein said processor is configured with software instructions to respond to said confidence score being below a threshold by repeating said selection, evaluation, and extraction until said confidence score meets or exceeds said threshold, or until each received image has been selected and evaluated.

5. The vehicle wheel alignment inspection system of claim 3 wherein said processor is a multi-core or multi-threaded processor, configured with software instructions to evaluate a plurality of said received images in parallel.

6. The vehicle wheel alignment inspection system of claim 3 wherein said processor is further configured with software instructions to respond to said confidence score meeting or exceeding a threshold, for an image acquired with a first camera, by carrying out a verification prior to generating said output associated with said extracted license plate data, said verification consisting of repeating said steps of selecting, evaluating, and extracting, on unselected images from at least one additional camera until said confidence score meets or exceeds said threshold for an image acquired by said at least one additional camera, or until each of said received images is selected and evaluated.

7. The vehicle wheel alignment inspection system of claim 3 wherein said plurality of cameras associated with said at least one inspection unit includes at least one camera positioned and oriented to have a field of view aligned towards vehicles approaching said inspection lane, and at least one camera positioned and oriented to have a field of view aligned towards vehicles departing said inspection lane.

8. The vehicle wheel alignment inspection system of claim 3 wherein said a first inspection unit is positioned adjacent a first lateral side of the inspection lane, and wherein a second unit is positioned adjacent an opposite lateral side of the inspection lane from said first inspection unit, whereby said plurality of cameras includes at least one camera positioned within said first inspection unit and at least one camera positioned within said second wheel alignment inspection unit.

9. The vehicle wheel alignment inspection system of claim 8 wherein said plurality of cameras includes, for each lateral side of the inspection lane, at least one camera positioned and oriented to have a field of view aligned towards vehicles approaching said inspection lane, and at least one camera positioned and oriented to have a field of view aligned towards vehicles departing said inspection lane.

10. The vehicle wheel alignment inspection system of claim 3 wherein said processor is configured with software instructions to select one or more of said plurality of cameras, and to prioritize said steps of evaluating and extracting images received from one or more selected cameras over images received from each remaining camera in said plurality of cameras.

11. The vehicle wheel alignment inspection system of claim 10 wherein said processing system is further configured with software instructions to select said one or more of said plurality of cameras in response to ambient lighting conditions within said inspection lane altering visibility of features within said associated fields of view.

12. The vehicle wheel alignment inspection system of claim 10 wherein said processing system is further configured with software instructions to select said one or more of said plurality of cameras in response to either an operator input or an operator instruction.

13. The vehicle wheel alignment inspection system of claim 10 wherein said processing system is further configured with software instructions to select said one or more of said plurality of cameras in response to an expected license plate location on said observed surfaces of said vehicles passing through said inspection lane.

14. A method for identifying license plate features of a vehicle in motion within a vehicle inspection lane, comprising:

acquiring a first image of said vehicle from a first camera, and a second image of said vehicle from a second camera, said first and second cameras having different fields of view encompassing a common observed surface of the vehicle;

evaluating said first image to determine a presence or an absence of a license plate on said common observed surface of the vehicle, and responsive to said evaluation determining said presence in said first image, extracting data associated with features of said license plate from said first image;

establishing for said first image, a first figure of merit based on said evaluation of said first image;

evaluating said second image to determine a presence or an absence of a license plate on an observed surface of the vehicle, and responsive to said evaluation determining said presence in said second image, extracting data associated with features of said license plate from said second image;

establishing for said second image, a second figure of merit based on said evaluation of said second image;

comparing said first and second figures of merit to identify which figure of merit has a greater value; and generating an output representative of said license plate features of said vehicle in motion using said data extracted from the image associated with said figure of merit having said greater value.

15. The method of claim 14 wherein said common observed surface of the vehicle is either a front surface of the vehicle or a rear surface of the vehicle.

* * * * *